United States Patent
Denbo et al.

(10) Patent No.: US 10,611,286 B2
(45) Date of Patent: *Apr. 7, 2020

(54) CHILD RESTRAINT WITH CUPHOLDER

(71) Applicant: Dorel Juvenile Group, Inc., Foxboro, MA (US)

(72) Inventors: Sean R. Denbo, Columbus, IN (US); Mei-Hui Lin, Nashville, IN (US); Kyle M. Franke, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/022,785

(22) Filed: Jun. 29, 2018

(65) Prior Publication Data

US 2018/0304794 A1     Oct. 25, 2018

Related U.S. Application Data

(63) Continuation of application No. 15/337,903, filed on Oct. 28, 2016, now Pat. No. 10,023,092.

(60) Provisional application No. 62/248,576, filed on Oct. 30, 2015.

(51) Int. Cl.
*B60N 3/10* (2006.01)
*B60N 2/28* (2006.01)

(52) U.S. Cl.
CPC ............... *B60N 3/103* (2013.01); *B60N 2/28* (2013.01); *B60N 2/2803* (2013.01)

(58) Field of Classification Search
CPC .......... B60N 3/101; B60N 3/103; B60N 2/28; B60N 2/2803
See application file for complete search history.

(56) References Cited

U.S. PATENT DOCUMENTS

| | | |
|---|---|---|
| 4,818,017 A | 4/1989 | Dykstra et al. |
| 5,181,761 A | 1/1993 | Meeker |
| 5,551,751 A | 9/1996 | Sedlack et al. |
| 5,609,393 A | 3/1997 | Meeker et al. |
| 5,615,925 A | 4/1997 | Kain |
| 5,746,478 A | 5/1998 | Lumley et al. |
| 5,890,762 A | 4/1999 | Yoshida |
| 6,139,101 A | 10/2000 | Berringer et al. |
| 6,428,099 B1 | 8/2002 | Kain |
| 6,467,839 B1 | 10/2002 | Kain |
| 6,550,862 B2 | 4/2003 | Kain |
| 6,612,649 B2 | 9/2003 | Kain |
| 6,997,509 B2 | 2/2006 | Kain |
| 7,246,855 B2 | 7/2007 | Langmaid et al. |
| RE40,010 E | 1/2008 | Kain |
| 7,360,830 B2 | 4/2008 | Balensiefer et al. |
| 7,584,867 B2 | 9/2009 | Burbrink |
| 9,162,600 B2 | 10/2015 | Gaudreau, Jr. |
| 10,023,092 B2 * | 7/2018 | Denbo .................. B60N 3/103 |
| 2012/0292956 A1 | 11/2012 | Gaudreau, Jr. |
| 2015/0375660 A1 | 12/2015 | Gaudreau, Jr. |
| 2016/0193944 A1 | 7/2016 | Gaudreau, Jr. |
| 2017/0182937 A1 | 6/2017 | Takahama |
| 2017/0259720 A1 | 9/2017 | Lombardi et al. |

* cited by examiner

*Primary Examiner* — Philip F Gabler

(74) *Attorney, Agent, or Firm* — Barnes & Thornburg LLP

(57) ABSTRACT

A child restraint includes a juvenile seat having a seat bottom and a seat back extending upwardly from the seat bottom. The juvenile seat further includes a cupholder coupled to the seat bottom.

17 Claims, 8 Drawing Sheets

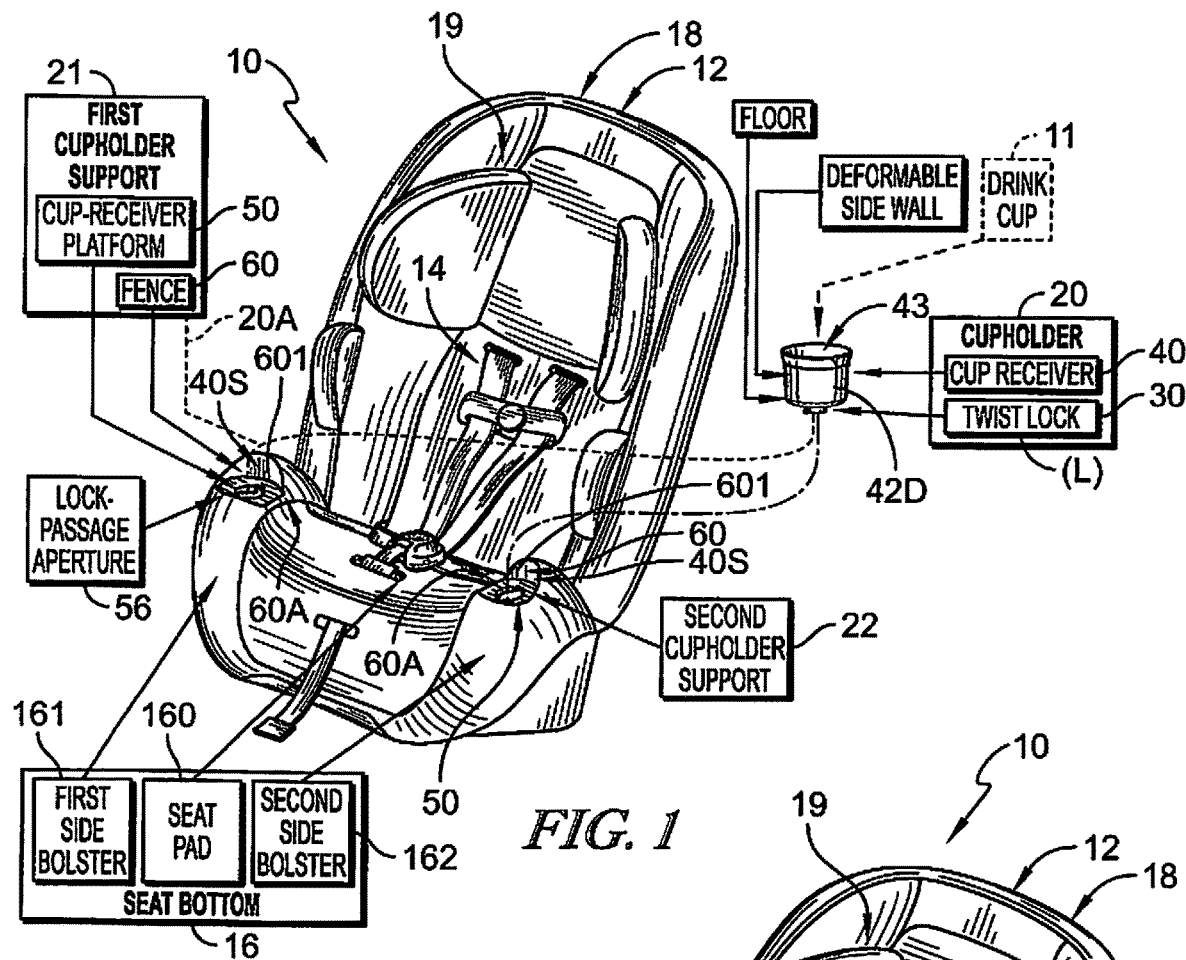
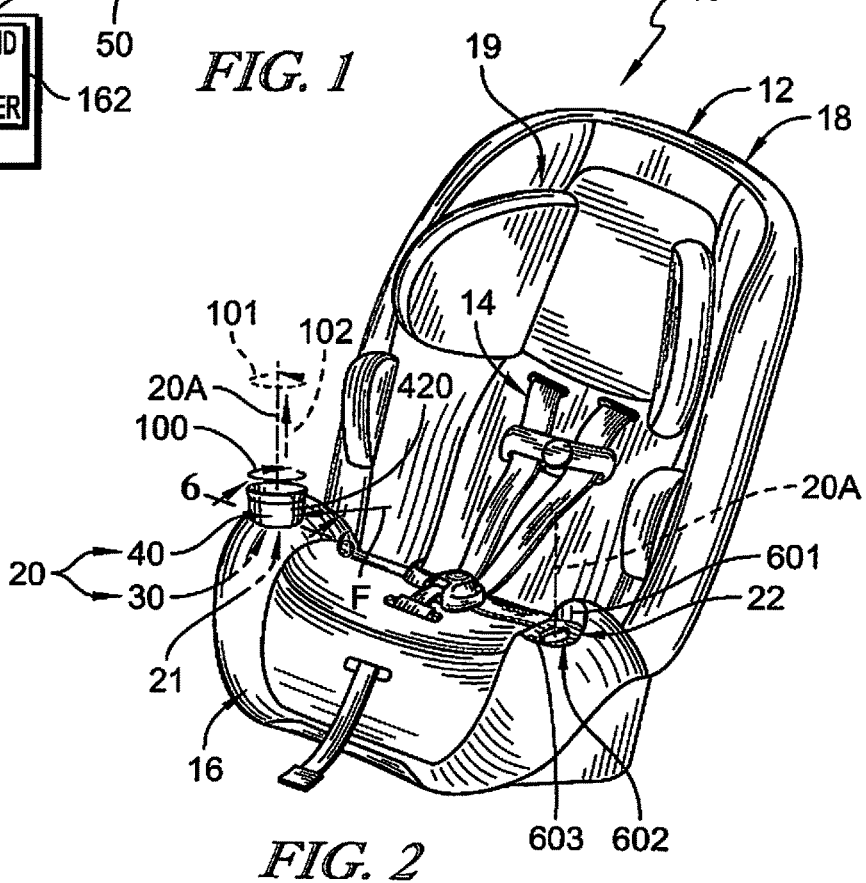
FIG. 1
FIG. 2

CHILD RESTRAINT WITH CUPHOLDER

PRIORITY CLAIM

This application is a continuation of U.S. application Ser. No. 15/337,903, filed Oct. 28, 2016, which claims priority under 35 U.S.C. § 119(e) to U.S. Application No. 62/248,576, filed Oct. 30, 2015, each of which is expressly incorporated by reference herein.

BACKGROUND

The present disclosure relates to child restraints, and in particular to juvenile seats for use on passenger seats in vehicles. More particularly, the present disclosure relates to a cupholder included in a juvenile seat.

SUMMARY

According to the present disclosure, a child restraint includes a juvenile seat having a seat bottom and a seat back extending upwardly from the seat bottom. In illustrative embodiments, the child restraint also includes a child-restraint harness coupled to the juvenile seat.

In illustrative embodiments, the juvenile seat includes a cupholder support coupled to the seat bottom and a cupholder mounted on the cupholder support. The cupholder includes a cup receiver having a floor and a side wall arranged to cooperate with the floor to form a cup-receiving cavity sized to receive a drink cup used by a child seated in the juvenile seat.

In illustrative embodiments, the side wall of the cup receiver includes a deformable portion that is unsupported by the cupholder support and is configured to provide crumple means in the side wall for deforming elastically to change from an initial shape and move relative to the floor to assume a different temporary shape and reduce a volume of the cup-receiving cavity temporarily only during exposure of the deformable portion to an external impact force and for returning to the initial shape following cessation of the external impact force. In illustrative embodiments, the side wall of the cup receiver is made of a deformable elastic material to provide the deformable portion of the cup receiver with a deformable elastic quality.

In illustrative embodiments, the cupholder also includes cup-receiver lock means coupled to the floor of the cup receiver for retaining the cup receiver in a fixed position on the cupholder support to locate the deformable portion of the side wall of the cup receiver in spaced-apart relation to the cupholder support. The deformable portion is therefore free to move relative to the cupholder support and the seat bottom during exposure to the external impact force.

In a first illustrative embodiment, the cup-receiver lock means of the cupholder includes a downwardly extending twist lock. The twist lock is coupled to the floor of the cup receiver and arranged to mate with a cup-receiver platform included in the cupholder support following downward movement of the twist lock through an upwardly opening lock-receiver aperture formed in the cup-receiver platform and subsequent rotation of the cup receiver and twist lock about a vertical axis of rotation to cause the twist lock to move on an inclined ramp included in the cup-receiver platform and located under the cup-receiver platform and engage an anti-rotation stop also included in the cupholder support and located under the cap-receiver platform.

In a second illustrative embodiment, the cup-receiver lock means of the cupholder further includes a downwardly extending push-and-snap lock. The push-and-snap lock is coupled to the floor of the cup receiver and arranged to mate with the cup-receiver platform included in the cupholder support after downward movement of the push-and-snap lock through the upwardly opening lock-receiver aperture formed in the cup-receiver platform.

In illustrative embodiments, the seat bottom of the juvenile seat includes a seat pad for supporting a child seated in the child restraint and first and second side bolsters arranged to lie in laterally spaced-apart relation to one another to locate the seat pad therebetween. In illustrative embodiments, each side bolster is arranged to extend upwardly above the seat pad to provide an armrest for a child seated on the seat pad. In illustrative embodiments, each side bolster is a shell formed to include an inner perimeter edge bordering an upwardly opening aperture and the companion cupholder support is coupled to the inner perimeter edge of the shell to lie in a hollow region located under and bounded by the shell and cause the floor of the cup receiver to lie in that hollow region when the cupholder is mounted on the cupholder support.

In illustrative embodiments, the cupholder support includes a cup-receiver platform having a top wall formed to include the lock-passage aperture and a fence coupled to an outer perimeter edge of the top wall and arranged to extend upwardly from the top wall to mate with the inner perimeter edge of a companion shell to hold the top wall in horizontally extending stationary position relative to the companion shell. The cupholder support also includes a downwardly sloping inclined ramp coupled to the underside of the top wall and arranged to extend partly around the lock-passage aperture and an anti-rotation stop located under the top wall at a lowest end of the inclined ramp.

In use, in illustrative embodiments of the present disclosure, a caregiver mounts a cupholder on a cupholder support by holding the cup receiver above the horizontally extending top wall of the cup-receiver platform and then moving the cup receiver downwardly to pass the cup-receiver lock means downwardly through the lock-passage aperture formed in the top wall of the cup-receiver platform. When the cup-receiver lock means of the cupholder is a twist lock in accordance with the first embodiment of the present disclosure, the caregiver then rotates the cupholder about a vertical rotation axis to cause an anchor tab included in the twist lock to move on the downwardly sloping inclined ramp until the anchor tab engages an adjacent anti-rotation stop to block further rotation of the cupholder about the vertical rotation axis so that the cupholder is retained in a stationary position on the cupholder support that is mounted on a side bolster of the seat bottom. In contrast, when the cup-receiver lock means of the cupholder is a push-and-snap lock in accordance with a second embodiment of the present disclosure, the caregiver pushes the cup receiver downwardly toward the underlying top wall of the cup-receiver platform until downwardly extending elastic anchors included in the push-and-snap lock and coupled to the underside of the floor of the cup receiver snap into engagement with an underside of the top wall of the cup-receiver platform to trap the cup-receiver platform between the floor of the cup receiver and laterally extending anchor tabs included in the downwardly extending elastic anchors so that the cupholder is retained in a stationary position on the cupholder support that is mounted on a side bolster of the seat bottom.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a child restraint in accordance with a first embodiment of the present disclosure and showing that the child restraint includes a juvenile seat comprising a seat bottom, a first cupholder support coupled to a far side of the seat bottom, a second cupholder coupled to a near side of the seat bottom, and a cupholder adapted to be mounted in accordance with the present disclosure by a caregiver on either the first or second cupholder support by using in sequence downward movement along a vertical axis as suggested in FIG. 1 and rotational movement about the vertical axis as suggested in FIG. 2 and suggesting that the cupholder includes a cup receiver sized to receive a drink cup used by a child seated in the juvenile seat and a downwardly extending cup-receiver twist lock coupled to the underside of the cup receiver and showing that each cupholder support is coupled to one of the side bolsters included in the seat bottom and formed to include a cup-receiver platform on which the cup receiver will set when it is mounted to the cupholder support and a fence arranged to surround a portion of the cup receiver and interconnect the cup-receiver platform and a perimeter edge of the companion side bolster;

FIG. 2 is a view similar to FIG. 1 showing rotation of the cupholder of FIG. 1 after it has been moved downwardly along a vertical axis by a caregiver to pass the twist lock of the cupholder through the lock-passage aperture formed in a cup-receiver platform of the first cupholder support mated to the first side bolster of the seat bottom to cause the twist lock to engage the underside of the cup-receiver platform so that the cupholder is retained in a fixed position on the first cupholder support;

FIG. 7 is an enlarged perspective view showing downward movement of a cupholder that is to be mounted on the second cupholder support along a vertical axis toward the underlying second cupholder support that is mounted on the second side bolster of the seat bottom;

FIG. 8 is a view similar to FIG. 7 after the twist lock of the cupholder has been passed downwardly through the lock-receiver aperture formed in the cup-receiver platform included in the second cupholder support;

FIG. 9 is a view similar to FIG. 8 after the cupholder has been rotated about the vertical axis in a clockwise direction to cause the first anchor tab to move on a first inclined ramp to engage a first anti-rotation stop and to cause the second anchor tab to move on a second inclined ramp to engage a second anti-rotation stop;

FIG. 12 is an enlarged perspective view showing the underside of the cup-receiver stabilizer that is coupled to a rear portion of the cup receiver and showing downward movement of the cupholder along a vertical axis toward the underlying second cupholder support that is mounted on the second side bolster of the seat bottom; and FIG. 13 is a view similar to FIG. 7 after the push-and-snap lock has been passed downwardly through the lock-receiver aperture formed in the cup-receiver platform included in the companion cupholder support and the outwardly extending anchor tab included at the lower end of each downwardly extending elastic anchor has snapped into engagement with an underside of the cup-receiver platform of the companion cupholder support and suggesting that the cup-receiver stabilizer is mated with a portion of the second side bolster of the seat bottom when the cup receiver is mounted on the neighboring underlying second cupholder support.

DETAILED DESCRIPTION

Figure 3:
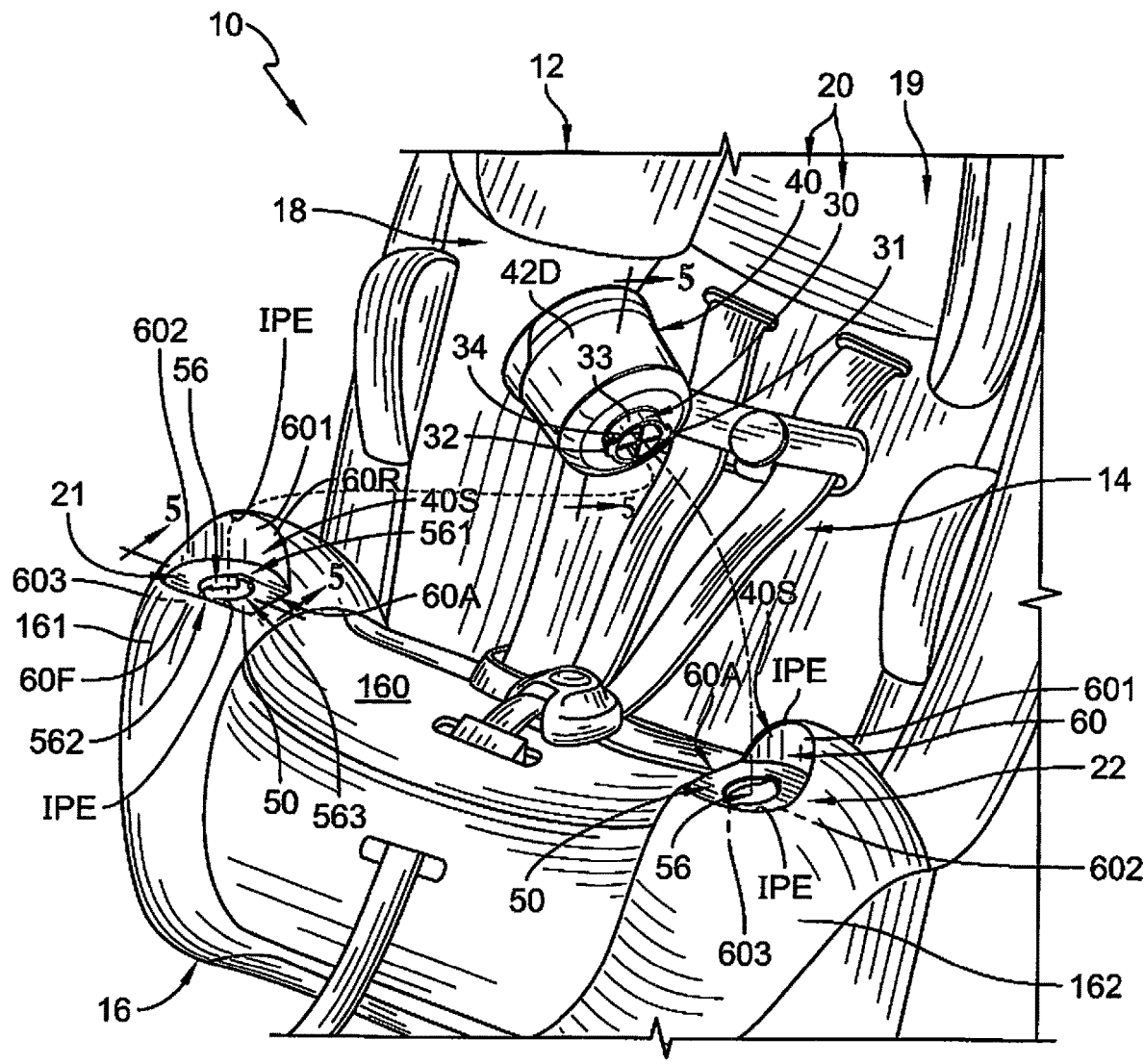
FIG. 3 is an enlarged perspective view of a portion of the juvenile seat of FIG. 1 and showing the cupholder of FIG. 1 in a tilted orientation to show that the twist lock comprises a cylindrical tab-support sleeve arranged to extend downwardly from a floor of the cup receiver, first and second anchor tabs cantilevered to a lower portion of the cylindrical tab-support sleeve and arranged to extend in opposite directions, and a cross-shaped rigidifying structure coupled to an interior wall of the cylindrical tab-support sleeve and arranged to rigidify the cylindrical tab-support sleeve and showing that each of the lock-passage apertures formed in the cupholder supports has a shape matching the cross-sectional profile of the twist lock and comprising, in sequence, a rectangular first tab receiver extending toward the seat back, a round sleeve receiver, and a rectangular second tab receiver extending away from the seat back.
Figure 4A:
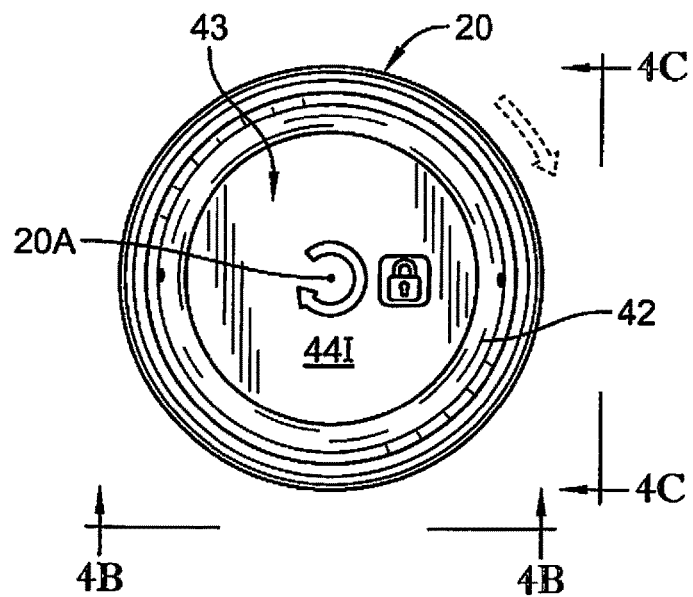
FIG. 4A is a top plan view of the cupholder shown in FIGS. 1 and 3 showing a rotation icon and a locking icon to suggest that clockwise rotation of the cupholder about a vertical axis will lock the cupholder to an underlying cupholder support.
Figure 4B:
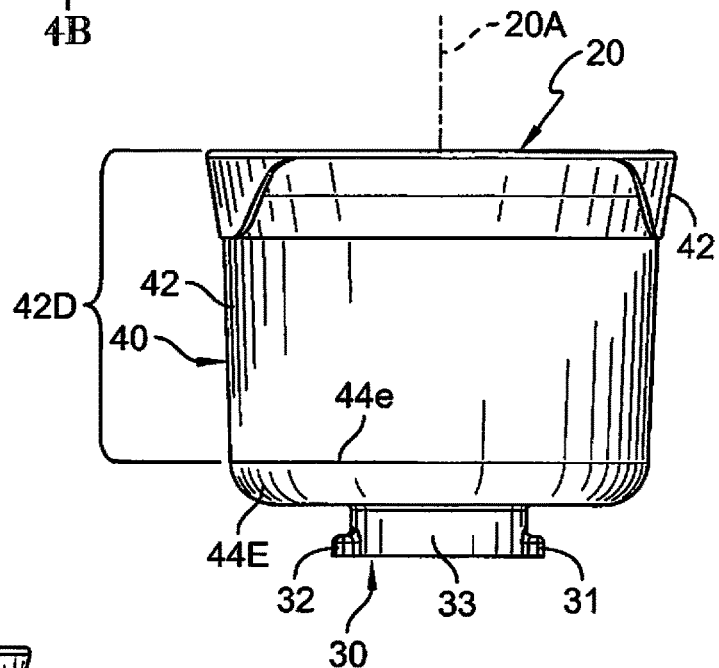
FIG. 4B is a side elevation view of the cupholder of FIG. 4A taken along line 4B-4B of FIG. 4A showing the cup receiver and the twist lock underlying the cup receiver and showing that the twist lock comprises a tab-support sleeve coupled to the underside of the cup receiver and two anchor tabs coupled to the tab-support sleeve and arranged to project outwardly away from the tab-support sleeve in opposite directions.
Figure 4C:
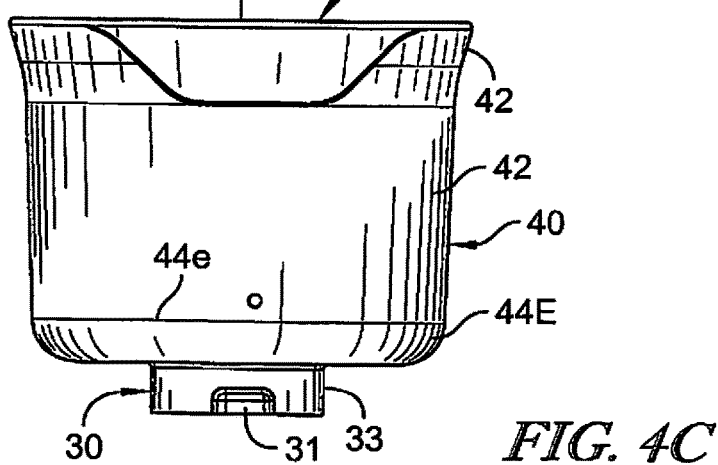
FIG. 4C is a side elevation view of the cupholder similar to FIG. 4B and taken along line 4C-C of FIG. 4A after the cupholder has been rotated 90° in a clockwise direction (see FIG. 4A) about a vertical axis.

An illustrative child restraint 10 comprises a juvenile seat 12 and a child-restraint harness 14 coupled to juvenile seat 12 as shown in FIGS. 1 and 2. Juvenile seat 12 includes a seat bottom 16 comprising (in series) a first side bolster 161, a seat pad 160, and a second side bolster 162. Child restraint 10 also includes a first cupholder support 21 coupled to first side bolster 161, a second cupholder support 22 coupled to second side bolster 162, and a cupholder 20 configured to be coupled to either of the first or second cupholder supports 21, 22 at the option of a caregiver as suggested in FIG. 1. A cupholder 20 having a twist lock 30 in accordance with a first embodiment of the present disclosure is shown, for example, in FIGS. 1-9 while a cupholder 220 having a cup receiver 240 and a push-to-snap lock 230 comprising three downwardly extending elastic anchors 231, 232, 233 coupled to the underside of cup receiver 240 in accordance with a second embodiment of the present disclosure is shown, for example, in FIGS. 10-13.

Cupholder 20 includes a cup receiver 40 sized to receive a drink cup 11 used by a child (not shown) seated in juvenile seat 12 as suggested diagrammatically in FIG. 1. Twist lock 30 of cupholder 20 is coupled to the underside of cup receiver 40 and arranged to pass downwardly through a lock-passage aperture 56 formed in the first cupholder support 21 when cupholder 20 is placed on a cup-receiver platform 50 of the first cupholder support 21 as suggested in FIG. 1. Rotation of cupholder 20 on cup-receiver platform 50 about a vertical axis 20A in a clockwise direction 100 as suggested in FIG. 2 causes twist lock 30 to mate with cup-receiver platform 50 to retain cup receiver 40 in a fixed position on first cupholder support 21. Cupholder 20 can be rotated about vertical axis 20A in a counterclockwise direction 101 shown in phantom in FIG. 2 and then lifted upwardly in direction 102 to separate cupholder 20 from the underlying first cupholder support 21 so that cupholder 20 could be mounted by the caregiver on the second cupholder support 22 using a similar two-stage mounting process in accordance with the present disclosure as shown, for example, in FIGS. 7-9.

Juvenile seat 12 also includes a seat back 18 arranged to extend upwardly from seat bottom 16 and a headrest 19 mounted for up-and-down movement on seat back 18 as suggested in FIG. 1. In an illustrative embodiment, child-restraint harness 14 is coupled to seat bottom 16, seat back 18, and headrest 19 as suggested in FIG. 1.

Figure 5:
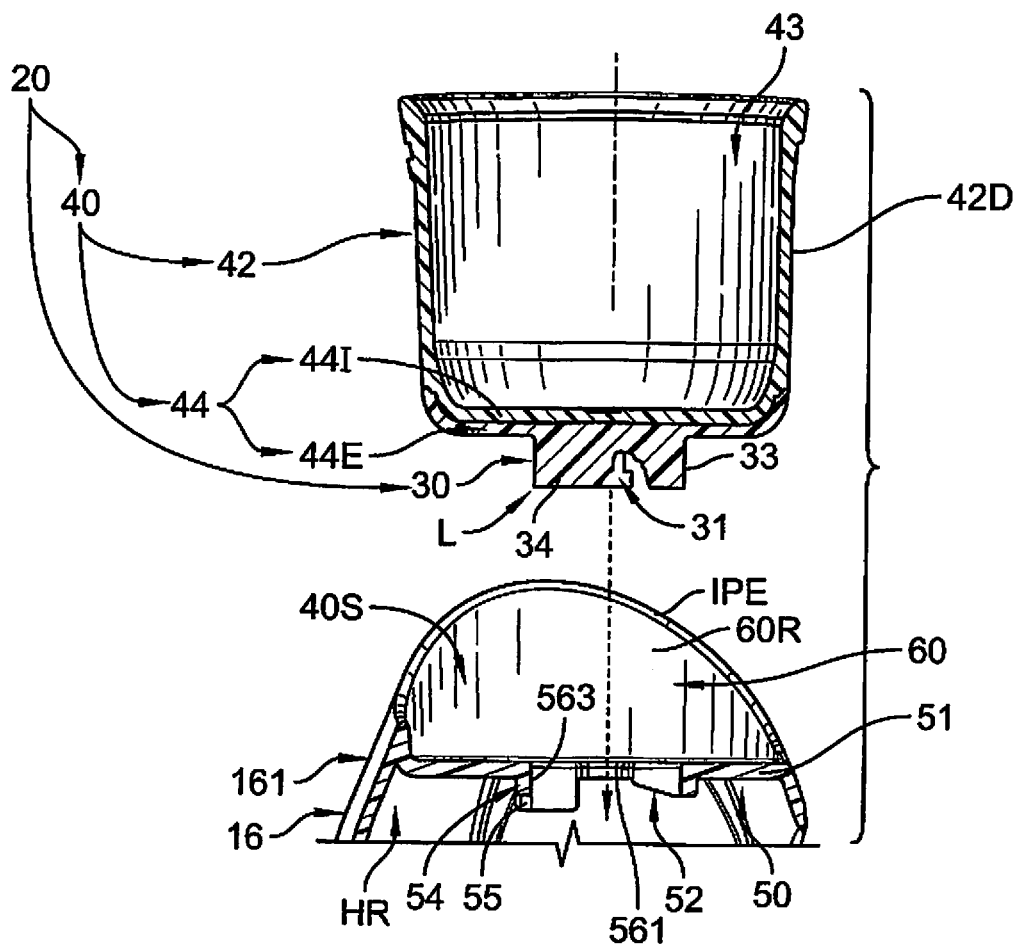
FIG. 5 is a sectional view of the cupholder taken along a first line 5-5 in FIG. 3 and of portions of the first side bolster and the first cupholder support taken along a second line 5-5 in FIG. 3 showing the cupholder before it is mounted by a caregiver on the first cupholder support with portions broken of the cupholder away to reveal the rearwardly extending first anchor tab and showing alignment of the tab-support sleeve with the underlying round sleeve receiver formed in the cup-receiver platform and alignment of the first anchor tab with the underlying first tab receiver formed in the cup-receiver platform.

An illustrative cup receiver 40 includes a side wall 42 and a floor 44 comprising an interior layer 441 and an exterior layer 44E as suggested in FIG. 5. Side wall 42 and interior layer 441 cooperate to form a monolithic component made of a deformable elastic material to provide portions 42D of side wall 42 with a deformable elastic quality. In an illustrative embodiment, the entire side wall 42 above a top edge 44e of exterior layer 44E of floor 44 is made of a deformable elastic material. Such portions 42D of side wall 42 can deform elastically when exposed to external impact forces without impairing long-term cup-receiving functionality of cup receiver 40. Exterior layer 44E of floor 44 is coupled to the underside of interior layer 441 as suggested in FIG. 5 and is made of a relatively rigid material.

Twist lock 30 is coupled to the underside of exterior layer 44E of floor 44 and arranged to extend downwardly away from cup receiver 40 as suggested in FIG. 5. Twist lock 30 and exterior layer 44E cooperate to form a monolithic component as suggested in FIG. 5.

Twist lock 30 includes a tab-support sleeve 33 and first and second anchor tabs 31, 32 as shown, for example, in FIGS. 3, 4B, 4C, and 5. Tab-support sleeve 33 has a cylindrical shape and is arranged to extend downwardly from the underside of exterior layer 44E of floor 44. First and second anchor tabs 31, 32 are cantilevered to a lower portion of the cylindrical tab-support sleeve 33 and are arranged to extend in opposite directions as shown, for example in FIGS. 3 and 4B. Twist lock 30 also includes a cross-shaped elongated rigidifying structure 34 coupled to a cylindrical interior wall 331 of tab-support sleeve 33 and arranged to rigidify tab-support sleeve 33 as suggested in FIGS. 3 and 7.

Each of first and second cupholder supports 21, 22 includes a cup-receiver platform 50 and a fence 60 coupled to a perimeter edge of a cup-receiver platform 50 as suggested in FIGS. 1, 2, and 5. Cup receiver 40 is retained on cup-receiver platform 50 by twist lock 30 as suggested in FIG. 6 and is surrounded (at least in part) by the fence 60 that extends upwardly from cup-receiver platform 50 to mate with portions of a companion side bolster 121 or 122. Fence 60 includes a tall rear wall 601, an outer side wall 602, and a short front wall 603 in illustrative embodiments as suggested in FIG. 3.

Cup-receiver platform 50 includes a top wall 51 coupled to frame 60, a downwardly extending first inclined ramp 52 coupled to the underside of top wall 51 and associated with first anchor tab 31 of twist lock 30, and a first anti-rotation stop 53 located at a lowest end of first inclined ramp 52 and also associated with first anchor tab 31. In illustrative embodiments, cup-receiver platform 50 also includes a downwardly extending second inclined ramp 54 coupled to the underside of top wall 51 and associated with second anchor tab 32 of twist lock 30, and a second anti-rotation stop 55 located at a lowest end of second inclined ramp 54 and also associated with second anchor tab 32.

Top wall 51 of cup-receiver platform 50 is formed to include a lock-passage aperture 56 as shown, for example, in FIGS. 1 and 2. Lock-passage aperture 56 has a shape matching the cross-sectional profile of twist lock 30 and comprises, in sequence, a rectangular first tab receiver 561 sized to receive first anchor tab 31 during movement of twist lock 30 through lock-passage 56, a round sleeve receiver 563 sized to receive cylindrical tab-support sleeve 33 during movement of twist lock 30 through lock-passage 56, and a second tab receiver 562 sized to receive second anchor tab 32 during movement of twist lock 30 through lock-passage 56. Each of the first and second inclined ramps 52, 54 is curved and arranged to extend around the round sleeve receiver 563 as suggested in FIG. 7.

Each cupholder support 21, 22 is formed to include means for removably engaging and supporting any one of several external components associated with juvenile seat 12. In illustrative embodiments, either cupholder 20 or cupholder 220 can be mounted on cupholder support 21, 22 to achieve, for example, product differention of a child restraint.

According to the present disclosure, a child restraint 10 includes a juvenile seat 12 having a seat bottom 16 and a seat back 18 extending upwardly from seat bottom 16 as shown in FIG. 1. In illustrative embodiments, child restraint 10 also includes a child-restraint harness 14 coupled to juvenile seat 12 as suggested in FIG. 1.

Juvenile seat 12 includes a first cupholder support 21 coupled to seat bottom 16 and a cupholder 20 mounted on first cupholder support 31 as suggested in FIG. 2. Cupholder 20 includes a cup receiver 40 having a floor 44 and a side wall 42 arranged to cooperate with floor 44 to form a cup-receiving cavity 43 sized to receive a drink cup 11 used by a child seated in juvenile seat 12.

Side wall 42 of cup receiver 40 includes a deformable portion 42D that is unsupported by the first cupholder support 21 and is configured to provide crumple means in the side wall 42 for deforming elastically to change from an initial shape and move relative to floor 44 to assume a different temporary shape (not shown) and reduce a volume of the cup-receiving cavity 43 temporarily only during exposure of the deformable portion 42D to an external impact force and for returning to the initial shape following cessation of the external impact force. In illustrative embodiments, side wall 42 of cup receiver 44 is made of a deformable elastic material to provide the deformable portion 42D of the cup receiver 44 with a deformable elastic quality.

Cupholder 20 is a two-shot injection molded part in an illustrative embodiment with a polypropylene shot forming the bottom substrate (e.g., exterior layer 44E of floor 44) and a TPE shot forming the side wall 42 and interior layer 44I of floor 44. Cupholder 20 is removable and dishwasher safe and can be removed by a caregiver by a quarter turn about vertical axis 20A. A twist-to-lock feature provided by twist lock 30 allows for relatively quick assembly and easy removal by a caregiver. Cupholder 20 is designed to mate with cupholder supports 21, 22 to provide a tight fit that feels like a permanent fit but still allows for removal for cleaning.

Cupholder 20 also includes cup-receiver lock means (L) coupled to floor 44 of cup receiver 40 for retaining cup receiver 40 in a fixed position on the first cupholder support 21 to locate the deformable portion of side wall 42 of cup receiver 40 in spaced-apart relation to the first cupholder support 21 to free the deformable portion to move relative to the first cupholder support 21 and seat bottom 16 during exposure to the external impact force. In a first embodiment, the cup-receiver lock means (L) of cupholder 20 includes a downwardly extending twist lock 30 that is coupled to floor 44 of cup receiver 40 and arranged to mate with a cup-receiver platform 50 included in the first cupholder support 21 following downward movement of twist lock 30 through an upwardly opening lock-receiver aperture 56 formed in cup-receiver platform 50 and subsequent rotation of cup receiver 40 and twist lock 30 about a vertical axis 20A of rotation to cause twist lock 30 to move on an inclined ramp 52 included in the first cupholder support 21 and located under cup-receiver platform 50 and engage an anti-rotation stop 53 also included in the first cupholder support 21 and located under cup-receiver platform 50 as suggested in FIGS. 1-9. In a second embodiment, the cup-receiver lock means (L) of cupholder 220 further includes a downwardly extending push-and-snap lock 230 that is coupled to floor 244 of the cup receiver 240 and arranged to mate with the cup-receiver platform 50 included in the second cupholder support 22 after downward movement of the push-and-snap lock 230 through the upwardly opening lock-receiver aperture 56 formed in the cup-receiver platform 50 as suggested in FIGS. 10-13.

Seat bottom 16 of juvenile seat 12 includes a seat pad 160 for supporting a child seated in child restraint 10 and first and second side bolsters 161, 162 arranged to lie in laterally spaced-apart relation to one another to locate seat pad 160 therebetween as suggested in FIG. 1. Each side bolster 161, 162 is arranged to extend upwardly above seat pad 160 to provide an armrest for a child seated on seat pad 160. Each side bolster 161, 162 is a shell formed to include an inner perimeter edge IPE bordering an upwardly opening aperture as suggested in FIG. 3 and the companion cupholder support 21 or 22 is coupled to the inner perimeter edge IPE of the shell to lie in a hollow region HR located under and bounded by the shell and cause floor 44 of cup receiver 40 to lie in that hollow region HR when cupholder 20 is mounted on the cupholder support as suggested in FIG. 6.

First cupholder support 21 includes a cup-receiver platform 50 having a top wall 51 formed to include a lock-passage aperture 56 and a fence 60 coupled to an outer perimeter edge of top wall 51 and arranged to extend upwardly from top wall 51 to mate with the inner perimeter edge of a companion shell to hold top wall 51 in horizontally extending stationary position relative to the companion shell. First cupholder support 21 also includes a downwardly sloping inclined ramp 52 coupled to the underside of top wall 51 and arranged to extend partly around lock-passage aperture 56 and an anti-rotation stop 53 located under top wall 51 at a lowest end of inclined ramp 52.

In use, in illustrative embodiments of the present disclosure, a caregiver mounts a cupholder 20 on a cupholder support 21 or 22 by holding the cup receiver 40 above the horizontally extending top wall 51 of the cup-receiver platform 50 and moving the cup receiver 40 downwardly to pass the cup-receiver lock means (L) downwardly through the lock-passage aperture 56 formed in the top wall 51 of the cup-receiver platform 50. When the cup-receiver lock means (L) of the cupholder 20 is a twist lock 30 in accordance with the first embodiment of the present disclosure, the caregiver then rotates the cupholder 20 about a vertical rotation axis 20A to cause an anchor tab 31 included in the twist lock 30 to move on the downwardly sloping inclined ramp 52 until the anchor tab 31 engages an adjacent anti-rotation stop 53 to block further rotation of the cupholder 20 about the vertical rotation axis 20A so that the cupholder 20 is retained in a stationary position on the cupholder support 21 that is mounted on a side bolster 161 of the seat bottom 16. In contrast, when the cup-receiver lock means (L) of the cupholder 220 is a push-and-snap lock 230 in accordance with a second embodiment of the present disclosure, the caregiver pushes the cup receiver 240 downwardly toward the underlying top wall 51 of the cup-receiver platform 50 until downwardly extending elastic anchors 231, 232, 233 included in the push-and-snap lock 330 and coupled to the underside of the floor 244 of the cup receiver 240 snap into engagement with an underside of the top wall 51 of the cup-receiver platform 50 to trap the cup-receiver platform 50 between the floor 244 of the cup receiver 240 and laterally extending anchor tabs 231T, 232T, 233T included in the downwardly extending elastic anchors 231, 232, 233 so that the cupholder 220 is retained in a stationary position on the second cupholder support 22 that is mounted on a second side bolster 162 of the seat bottom 16.

Figure 10:
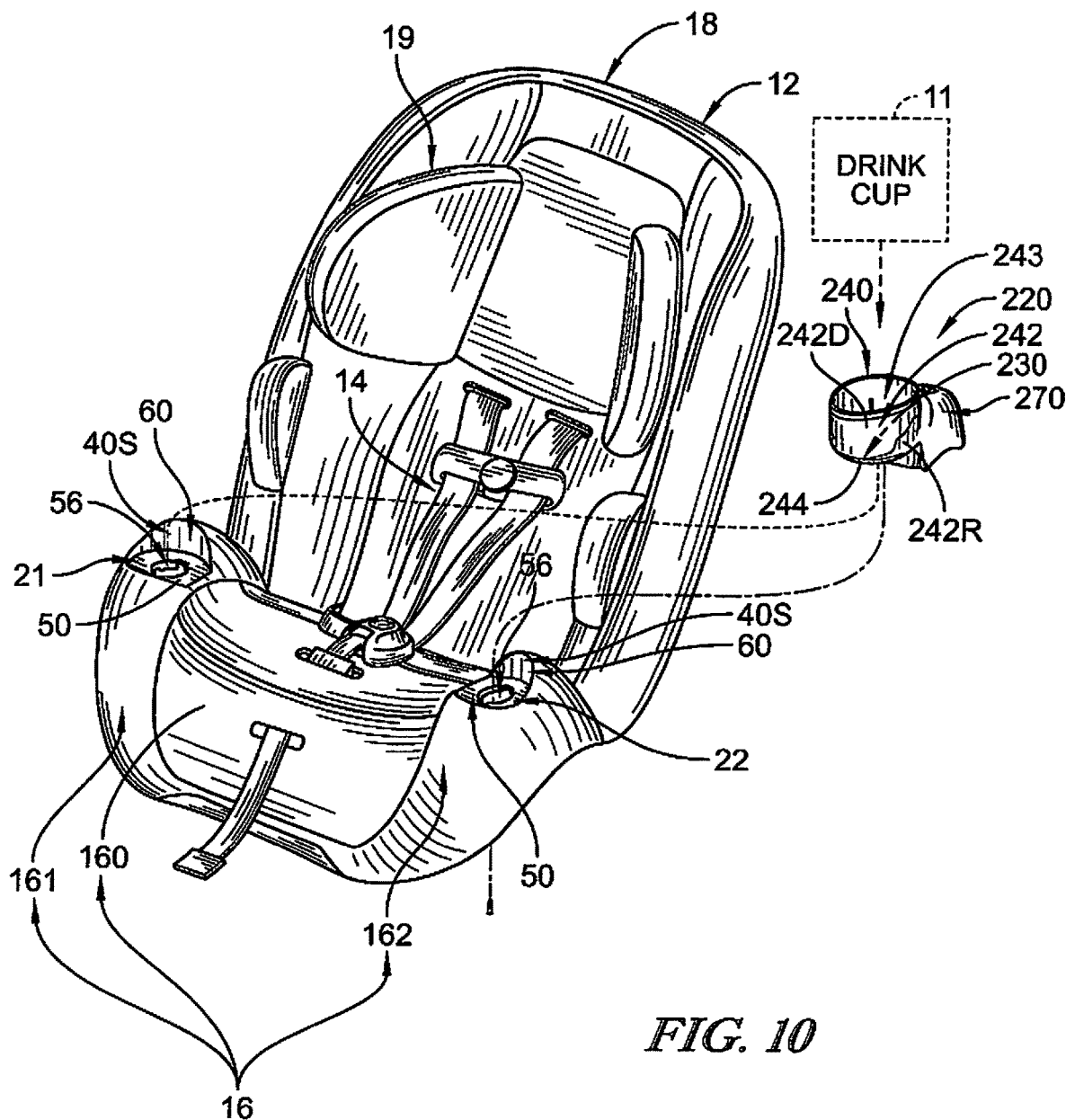
FIG. 10 is a perspective view of a child restraint in accordance with a second embodiment of the present disclosure including a juvenile seat comprising a seat bottom, a first cupholder support coupled to a far side of the seat bottom, a second cupholder coupled to a near side of the seat bottom, and a cupholder adapted to be mounted in accordance with the present disclosure, by a caregiver on either the first or second cupholder support by using downward movement along a vertical axis and suggesting that the cupholder includes a cup receiver sized to receive a drink cup used by a child seated in the juvenile seat, a downwardly extending cup-receiver push-and-snap lock coupled to the underside of the cup receiver, and a rearwardly extending cup-receiver stabilizer coupled to a rear portion of the cup receiver and adapted to mate with an underlying portion of a side bolster of the seat bottom when the cup receiver is mounted on a neighboring underlying cupholder support mounted on that side bolster.
Figure 11:
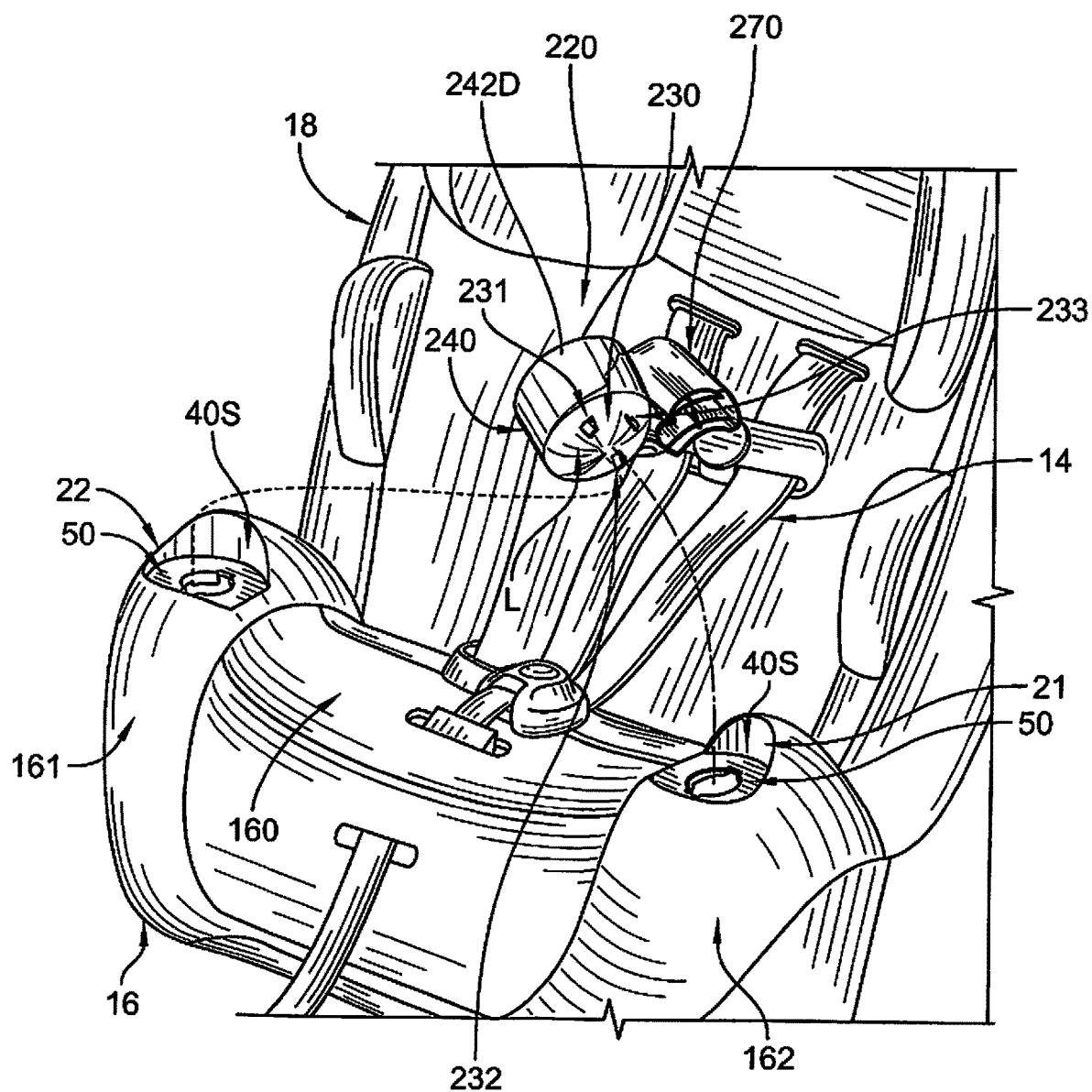
FIG. 11 is an enlarged perspective view of a portion of the juvenile seat of FIG. 10 and showing the cupholder of FIG. 10 in a tilted orientation to show that the push-and-snap lock comprises three downwardly extending elastic anchors coupled to the underside of the floor of the cup receiver and configured to mate either with the cup-receiver platform of the far first cupholder support or the cup-receiver platform of the near second cupholder support and that each elastic anchor includes a downwardly extending cantilevered elastic tab-support leg and a laterally extending anchor tab coupled to a free end of the tab-support leg.
Figure 12:
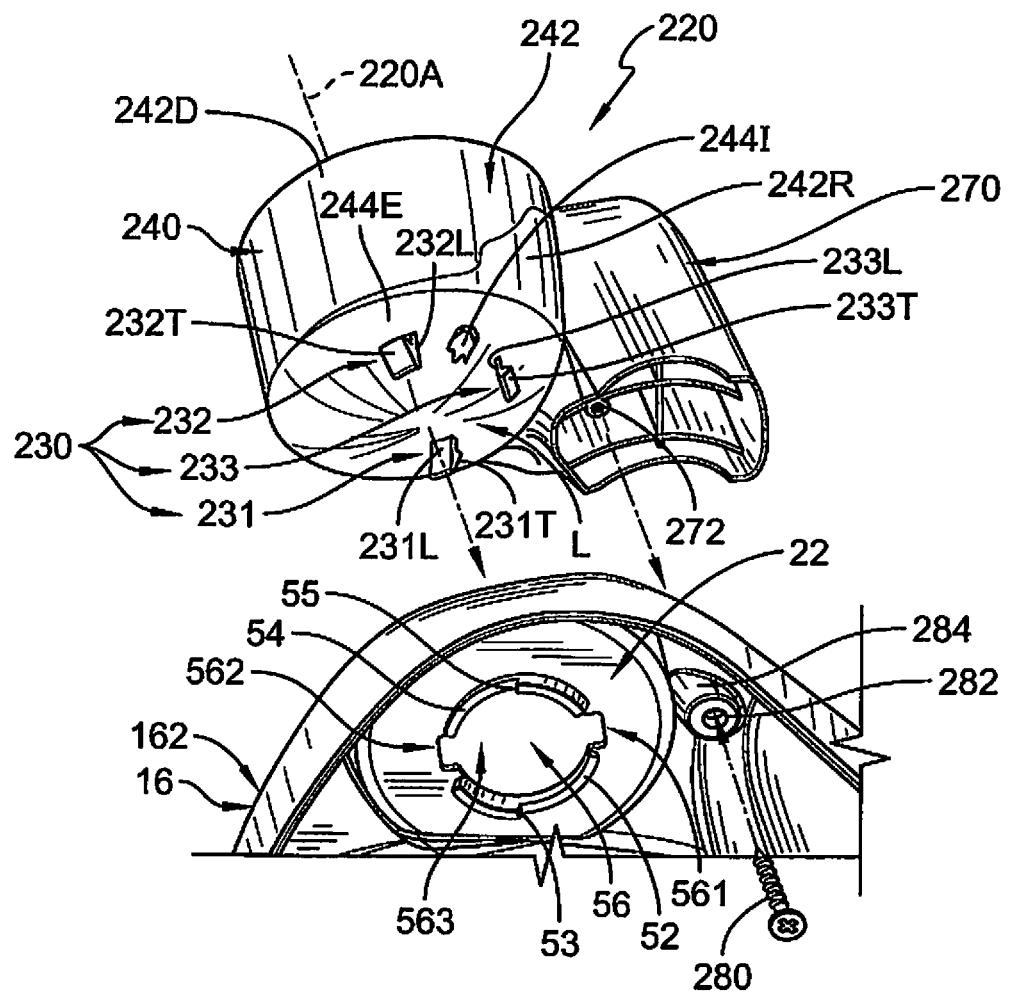
FIGS. 12 and 13 show steps for mounting the cupholder of FIGS. 10 and 11 on an underlying second cupholder support.
Figure 13:
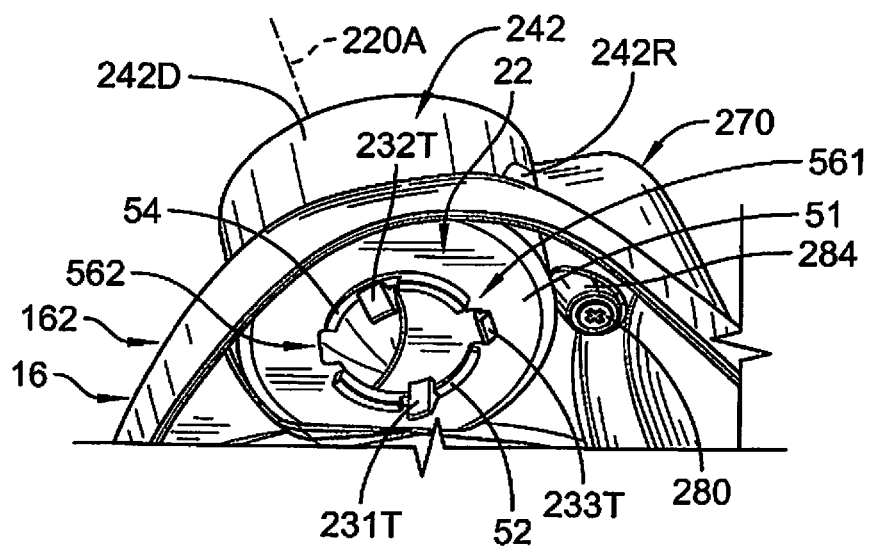

A cupholder 220 in accordance with a second embodiment of the present disclosure includes a cup receiver 240, a downwardly extending cup-receiver push-and-snap lock 230 coupled to the underside of cup receiver 240, and a rearwardly extending cup-receiver stabilizer 270 coupled to a rear portion of cup receiver 240 as suggested in FIGS. 10-13. Cup receiver 240 is sized to receive a drink cup 11 used by a child seated in juvenile seat 12 as suggested in FIG. 10. Push-and-snap lock 230 is configured to be coupled to a cup-receiver platform 50 included in first or second cupholder support 21 or 22 as suggested in FIGS. 10-13 to retain cup receiver 240 in a fixed position on a companion cupholder 21 or 22. Cup-receiver stabilizer 270 is adapted to mate with an underlying portion of a side bolster (e.g., second side bolster 162 as shown in FIGS. 12 and 13) of seat bottom 16. A fastener 280 is configured to pass through an aperture 282 formed in a fastener mount 284 included in second side bolster 162 as suggested in FIGS. 12 and 13 and engage a fastener receiver 272 included in cup-receiver stabilizer 270 to retain cup-receiver stabilizer 270 in a stationary position on second side bolster 162 of seat bottom 10.

Cup receiver 240 includes a floor 244 and a side wall 242 arranged to cooperate with floor 244 to form a cup-receiving cavity 243 sized to receive a drink cup 11 used by a child seated in juvenile seat 12 as suggested in FIG. 10. Side wall 242 of cup receiver 240 includes a deformable portion 242D that is unsupported by the first cupholder support 21 and is configured to provide crumple means in the side wall 242 for deforming elastically to change from an initial shape and move relative to floor 244 to assume a different temporary shape (not shown) and reduce a volume of the cup-receiving cavity 243 temporarily only during exposure of the deformable portion 242D to an external impact force and for returning to the initial shape following cessation of the external impact force. In illustrative embodiments, side wall 242 of cup receiver 240 is made of a deformable elastic material to provide the deformable portion 242D of the cup receiver 44 with a deformable elastic quality. Side wall 242 also includes a rigid portion 242R made of a relatively rigid material.

Floor 244 is similar to floor 44 in that floor 244 has an interior layer 244I and an exterior layer 244E as suggested in FIG. 12. Interior layer 244I is made of the same deformable elastic material used to form deformable portion 242D of side wall 242. Exterior layer 244E is made of a relatively rigid material as is cup-receiver stabilizer 270. In an illustrative embodiment, exterior layer 244E of floor 244, rigid portion 242R of side wall 242, and cup-receiver stabilizer 270 cooperate to form a monolithic component made of a relatively rigid material.

Cupholder 220 also includes cup-receiver lock means coupled to floor 244 of cup receiver 240 for retaining cup receiver 240 in a fixed position on the second cupholder support 22 to locate the deformable portion 242D of side wall 242 of cup receiver 240 in spaced-apart relation to the second cupholder support 22 to free the deformable portion 242D to move relative to the second cupholder support 22 and seat bottom 16 during exposure to the external impact force. In a second embodiment shown, for example, in FIGS. 10-13, the cup-receiver lock means of cupholder 220 further includes a downwardly extending push-and-snap lock 230 that is coupled to floor 244 of the cup receiver 240 and arranged to mate with the cup-receiver platform 50 included in the second cupholder support 22 after downward movement of the push-and-snap lock 230 through the upwardly opening lock-receiver aperture 56 formed in the cup-receiver platform 50 as suggested in FIGS. 10-13.

Cupholder 220 is shown in FIG. 11 in a tilted orientation to show that the push-and-snap lock 230 comprises three downwardly extending elastic anchors 231, 232, 233 coupled to the underside of floor 244 of cup receiver 240 and configured to mate either with the cup-receiver platform 50 of the far first cupholder support 21 or the cup-receiver platform 50 of the near second cupholder support 22 and that each elastic anchor 231-233 includes a downwardly extending cantilevered elastic tab-support leg 231L, 232L, or 233L and a laterally extending anchor tab 231T, 232T, or 233T coupled to a free end of the companion tab-support leg as suggested in FIG. 12.

Steps for mounting cupholder 220 on an underlying second cupholder support 22 are shown in FIGS. 12 and 13. FIG. 12 is an enlarged perspective view showing the underside of the cup-receiver stabilizer 270 that is coupled to a rear portion of cup receiver 240 and showing downward movement of cupholder 220 along a vertical axis 220A toward the underlying second cupholder support 22 that is mounted on second side bolster 162 of seat bottom 16. As suggested in FIG. 13, the push-and-snap lock 230 has been passed downwardly through the lock-receiver aperture 56 formed in cup-receiver platform 50 included in the second cupholder support 22 and the outwardly extending anchor tab 231T, 232T, or 233T included at the lower end of each downwardly extending elastic anchor 231L, 232L, or 233L has snapped into engagement with an underside of the cup-receiver platform 50 of the second cupholder support 22. Cup-receiver stabilizer 270 is mated with a portion of the second side bolster 162 of the seat bottom 16 when the cup receiver 240 is mounted on the neighboring underlying second cupholder support 22.

As suggested in FIG. 13, elastic anchors 231-233 are arranged to cause first anchor tab 231T to engage first inclined ramp 52, second anchor tab 232T to engage second inclined ramp 54, and third anchor tab 233T to engage a portion of the underside of top wall 51 when push-to-snap lock 230 is mated with cup-receiver platform 50 of second cupholder support 22 as suggested in FIG. 13. To account for the height of inclined ramps 52, 54, legs 231L and 232L are slightly longer than leg 233L as suggested in FIG. 13.

Figure 7A:
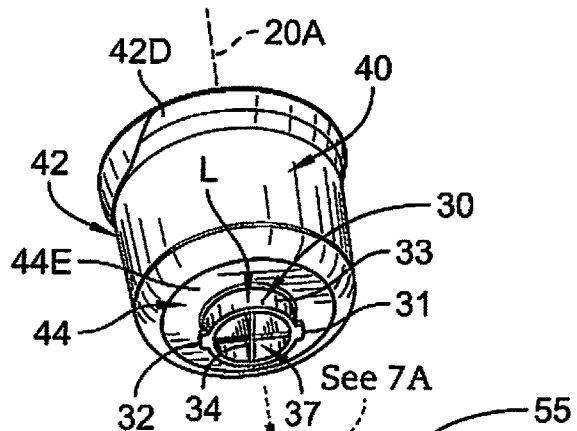
FIG. 7A is an enlarged portion of the cup-receiver platform taken from a circled region of FIG. 7 showing one of the downwardly extending inclined ramps and a companion anti-rotation stop located at a lowest end of the inclined ramp.
Figure 7A:
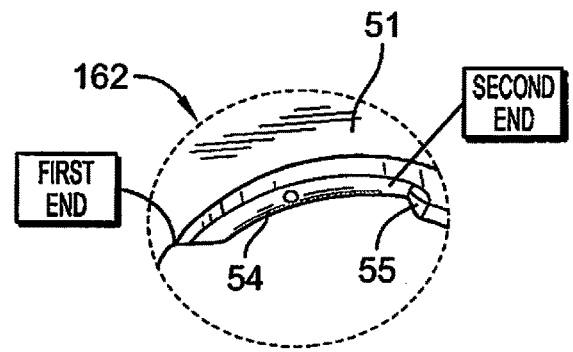
Figure 7:
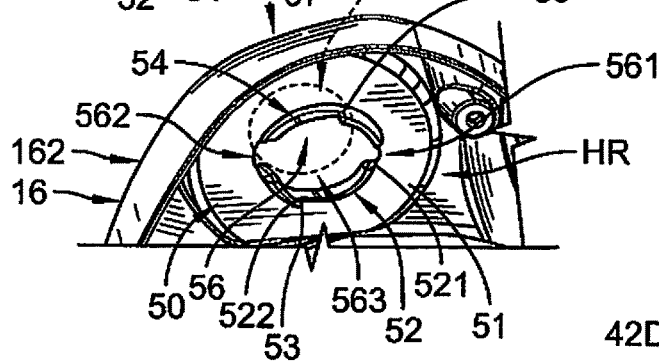
FIGS. 7-9 show steps for mounting the cupholder of FIG. 1 on an underlying second cupholder support.

A juvenile seat 10 includes a seat bottom 16, a first cupholder support 21 coupled to seat bottom 16, and a cupholder 20 adapted to be coupled to first cupholder support 21 as suggested in FIGS. 1 and 2. First cupholder support 21 includes a cup-receiver platform 50 having a top wall 51 formed to include a lock-passage aperture 56 and a lock retainer (LR) coupled to the underside of the top wall 51 as shown in FIGS. 1, 3, and 7. Lock retainer (LR) is arranged to extend downwardly away from the top wall 51 and partly around the lock-passage aperture 56 formed in the top wall 51 as suggested in FIG. 7. Cupholder 20 includes a cup receiver 40 having a floor 44 and a side wall 42 arranged to cooperate with the floor 44 to form a cup-receiving cavity 43 that is sized and adapted to receive a drink cup 11 used by a child seated on seat bottom 16 as suggested in FIG. 1.

A portion of cupholder 20 is deformable when exposed to an exterior force (F). Side wall 42 of cup receiver 40 includes a deformable portion 42D that is unsupported by the first cupholder support 21 and is made of a deformable elastic material as suggested in FIGS. 1-6. The deformable portion 42D is configured to deform elastically to change from an initial shape (shown in FIGS. 1-6) and move relative to the floor 44 to assume a different temporary shape and reduce a volume of the cup-receiving cavity 43 temporarily only during exposure of the deformable portion 42D to an external impact force (F) (see FIGS. 2 and 6) and to return to the initial shape following cessation of the external impact force (F).

Cupholder 20 also includes cup-receiver lock means (L) for locking cup receiver 40 to cup-receiver platform 50 of first cupholder support 2. Cup-receiver lock means (L) is coupled to floor 44 of cup receiver 40 for engaging a downwardly facing surface (S) of the lock retainer (LR) to retain floor 44 of cup receiver 40 in a fixed position on cup-receiver platform 50 of the first cupholder support 21 to locate the deformable portion 42D of side wall 42 of cup receiver 40 in spaced-apart relation to the cup-receiver platform 50 of first cupholder support 21. In one illustrative embodiment shown in FIGS. 1-9, cup-receiver lock means (L) is a twist lock 30. In another illustrative embodiment shown in FIGS. 10-13, cup-receiver lock means (L) is a push-and-snap lock 230.

Lock retainer (LR) includes a first downwardly sloping inclined ramp 52 coupled to underside of top wall 51 and formed to include a first end 521 located at a first distance from the underside of top wall 51 and an opposite second end 522 located at a relatively greater second distance from the underside of top wall 51 as suggested in FIG. 7. The first downwardly sloping inclined ramp 52 is arranged to extend partly around the lock-passage aperture 56 as suggested in FIG. 7. Lock retainer (LR) further includes a first anti-rotation stop 53 located under top wall 51 at the second end 522 of ramp 52 and arranged to lie in spaced-apart relation to the first end 521 of ramp 52. The first downwardly sloping inclined ramp 52 includes a first portion of the downwardly facing surface (S) of the lock retainer (LR).

Figure 8:
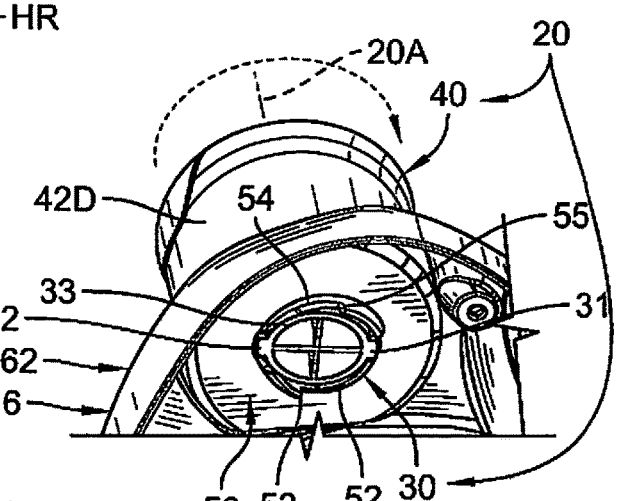
Figure 9:
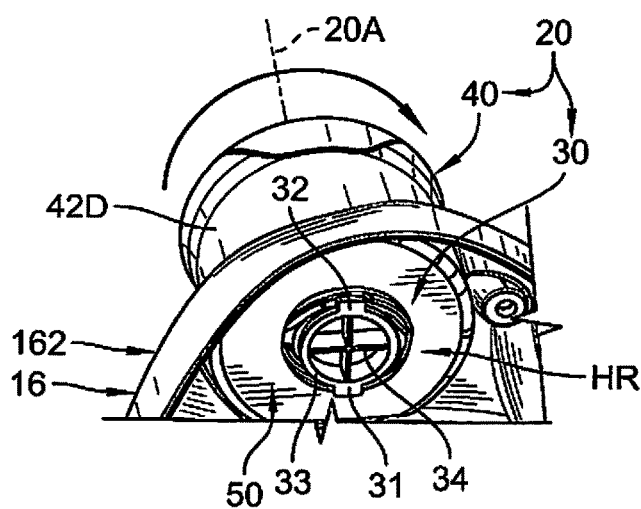

The cup-receiver lock means (L) engages the lock retainer (LR) in camming relation during installation of cupholder 20 on first cupholder support 21, as suggested in FIGS. 7-9. The cup-receiver lock means (L) includes a first laterally extending anchor tab 31 arranged to lie in a receiver-locking position to engage the first portion of the downwardly facing surface (S) to trap the first downwardly sloping inclined ramp 52 and a portion of the top wall 51 between the first laterally extending anchor tab 31 and the floor 44 of the cup receiver 40 as suggested in FIG. 6.

The cup-receiver lock means (L) is a twist lock 30 in a first illustrative embodiment of the present disclosure. Twist back 30 includes the first laterally extending anchor tab 31 and a tab-support sleeve 33 that is coupled to the floor 44 of the cup receiver 40 and to the first laterally extending anchor tab 31 as suggested in FIGS. 5-7. The tab-support sleeve 33 has a cylindrical shape and is configured to support the first laterally extending anchor tab 31 in spaced-apart relation to the floor 44 of the cup receiver 40 to provide a platform-receiving space 35 therebetween (as suggested in FIG. 7) that receives the portion of the top wall 51 and a companion portion of the first downwardly sloping inclined ramp 52 as suggested in FIG. 6 to establish an interference fit with the floor 44 of the cup receiver 40 and the first laterally extending anchor tab 31 when the floor 44 of the cup receiver 40 is retained in the fixed position on the cup-receiver platform 50 of the first cupholder support 21. The floor 44 and the first laterally extending anchor tab 31 are arranged to lie in spaced-apart parallel relation to one another as suggested in FIG. 6.

Figure 6:
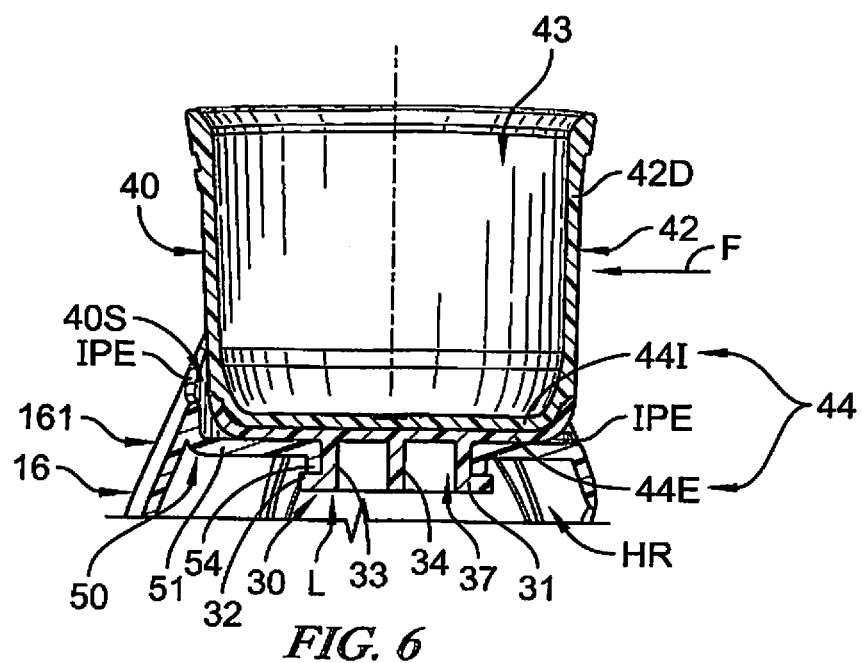
FIG. 6 is a sectional view of the cupholder and portions of the first side bolster and the first cupholder support taken along line 6-6 of FIG. 2.

Floor 44 of the cup receiver 40 includes an interior layer 441 and an exterior layer 44E as shown in FIG. 6. Side wall 42 and interior layer 441 of floor 44 cooperate to form a monolithic component made of a deformable elastic material and shaped to define the cup-receiving cavity 43 as suggested in FIGS. 5 and 6. Exterior layer 44E of floor 44 is made of a relatively rigid material and is coupled to an underside of interior layer 441 of floor and to tab-support sleeve 33 of twist lock 30 to locate the first laterally extending anchor tab 31 at a fixed distance in spaced-apart relation to exterior layer 441 of floor 44 to provide the platform-receiving space 35 therebetween.

First cupholder support 21 also includes a fence 60 coupled to a perimeter edge of cup-receiver platform 50 and arranged to extend upwardly away from the top wall 51 and the first downwardly sloping inclined ramp 52 as suggested in FIGS. 1-3, 5, and 6. Fence 60 is arranged to surround a part of the top wall 51 to cooperate with a topside of the top wall 51 to form a cup-receiver-receiving space 40S. Floor 44 and a lower portion of the side wall 42 of the cup receiver 40 are retained in the cup-receiver-receiving space 40S when the first laterally extending anchor tab 31 is arranged to lie in the receiver-locking position.

Seat bottom 16 includes a first side bolster 161, a second side bolster 162, and a seat pad 160 located between the first and second side bolsters 161, 162 as suggested in FIG. 1. First cupholder support 21 is coupled to first side bolster 161. Fence 60 is formed to include a side-wall aperture 60A facing toward seat pad 160 and second side bolster 162 as suggested in FIGS. 1 and 3 and opening into the cup-receiver-receiving space 40S to expose a section of the deformable portion 42D of the side wall 42 of the cup receiver 40 that is retained in the cup-receiver-receiving space 40S formed in the first cupholder support 21.

A seat back 18 is also included in juvenile seat 10 and arranged to extend upwardly from the seat bottom 16 as shown in FIGS. 1 and 2. Fence 60 includes a tall rear wall 601 located between the cup-receiver platform 50 and the seat back 18 and a relatively shorter front wall 603 arranged to lie in spaced-apart relation to the seat back 18 to locate the tall rear wall 601 therebetween as shown in FIG. 1. The tall rear wall 601 has a vertical edge that extends upwardly from the top wall 51 and the relatively shorter front wall 60F has a vertical edge that extends upwardly from the top wall 51 and lies in spaced-apart relation to the vertical edge of the tall rear wall 601 to define the side-wall aperture 60A of fence 60 therebetween as suggested in FIGS. 1 and 3. Each of the rear and front walls 601, 603 includes a concave interior surface facing toward the side wall 42 of the cup receiver 40 retained in the cup-receiver-receiving space 40S formed in the first cupholder support 21.

Floor 44 of the cup receiver 40 includes an interior layer 441 and an exterior layer 44E as shown in FIG. 6. Side wall 42 and interior layer 441 of floor 44 cooperate to form a monolithic component made of a deformable elastic material and shaped to define the cup-receiving cavity 43. Exterior layer 44E of floor 44 is made of a relatively rigid material and is coupled to an underside of interior layer 441 of floor 44 and to the cup-receiver lock means (L) to retain the cup-receiver lock means (L) in a stationary position on floor 44 of cup receiver 40.

The cup-receiver lock means (L) is a twist lock 30 that is coupled to an underside of exterior layer 44E of floor 40 in a first illustrative embodiment of the present disclosure. The cup-receiver lock means (L) and the exterior layer 44E of floor 40 cooperates to form a monolithic component. The twist lock 30 includes a tab-support sleeve 33 and first and second anchor tabs 31, 32. Tab-support sleeve 33 has an upper end coupled to underside of the exterior layer 44E of floor 40 and an opposite lower end coupled to the first and second anchor tabs 31, 32. Each of the first and second anchor tabs 31, 32 is arranged to lie in spaced-apart relation to the underside of exterior layer 44E of floor 40 to provide a platform-receiving space 35 therebetween that receives a portion of top wall 51 and a companion portion of the lock retainer (LR) to establish an interference fit with floor 44 of cup receiver 40 and the first and second anchor tabs 31, 32 when floor 44 of cup receiver 40 is retained in the fixed position on the cup-receiver platform 50 of the first cupholder support 21.

Tab-support sleeve 33 is formed to include an interior region 37 as suggested in FIGS. 6-9. The twist lock 30 further includes a cross-shaped rigidifying structure 34 coupled to an interior wall of the tab-support sleeve 33 to locate the cross-shaped rigidifying structure 34 in the interior region 37 of the tab-support sleeve 33. Tab-support sleeve 33 has a cylindrical shape in an illustrative embodiment. The first and second anchor tabs 31, 32 are cantilevered to the lower end of the tab-support sleeve 33.

The cup-receiver lock means (L) is a twist lock 30 in a first embodiment of the present disclosure. Twist lock 30 includes a tab-support sleeve 33 having an upper end coupled to underside of the floor 44 of cup receiver 40 and an opposite lower end arranged to extend away from floor 44 of cup receiver 40 and tab means 31, 32 coupled to the opposite lower end of the tab-support sleeve for mating with the downwardly facing surface (S) of the lock retainer (LR) following downward movement of the cup-retainer lock means (L) through an upwardly opening lock-receiver aperture 56 formed in the top wall 51 of the cup-receiver platform 50 and subsequent rotation of the cup receiver 40 and the twist lock 30 about a vertical axis of rotation to cause an upwardly facing cam-follower surface of the tab means 31, 32 to move on an inclined section of the downwardly facing surface (S) to retain the floor 44 of the cup receiver 40 in the fixed position on the cup-receiver platform 50 of the first cupholder support 21.

The cup-receiver lock means (L) is a push-and-snap lock 230 in a second embodiment of the present disclosure push-and-snap lock 230 includes a tab-support sleeve 33 having an upper end coupled to the underside of the floor 44 and an opposite lower end arranged to extend away from the floor 44 of the cup receiver 40 and tab means 331T, 332T, 333T coupled to the opposite lower end of the tab-support sleeve 230 for mating with the lock retainer (LR) of the cup-receiver platform 50 after downward movement of the push-and-snap lock 230 through an upwardly opening lock-receiver aperture 56 formed in the top wall 51 of the cup-receiver platform 50.

The invention claimed is:

1. A juvenile seat comprising
   a seat bottom,
   a cupholder support coupled to the seat bottom, the cupholder support including a cup-receiver platform having a top wall formed to include a lock-passage aperture and a lock retainer coupled to the underside of the top wall and arranged to extend downwardly away from the top wall and partly around the lock-passage aperture formed in the top wall, and
   a cupholder including a cup receiver having a floor and a side wall arranged to cooperate with the floor to form a cup-receiving cavity sized and adapted to receive a drink cup used by a child seated on the seat bottom, and
   wherein the side wall of the cup receiver includes a deformable portion that is unsupported by the cupholder support and is configured to deform elastically to change from an initial shape and move relative to the floor to assume a different temporary shape and reduce a volume of the cup-receiving cavity temporarily only during exposure of the deformable portion to an external impact force and to return to the initial shape following cessation of the external impact force, the deformable portion is made of a deformable elastic material, and the cupholder also includes cup-receiver lock coupled to the floor of the cup receiver for engaging a downwardly facing surface of the lock retainer to retain the floor of the cup receiver in a fixed position on the cup-receiver platform of the cupholder support to locate the deformable portion of the side wall of the cup-receiver in spaced-apart relation to the cup receiver platform of the cupholder support
   wherein the lock retainer includes a first downwardly sloping inclined ramp coupled to the underside of the top wall and formed to include a first end located at a first distance from the underside of the top wall and an opposite second end located at a relatively greater second distance from the underside of the top wall, the lock retainer further includes a first anti-rotation stop located under the top wall and arranged to lie in spaced-apart relation to the first end of the ramp, the first downwardly sloping inclined ramp includes a first portion of the downwardly facing surface, and the cup-receiver lock includes a first laterally extending anchor tab arranged to engage the first portion of the downwardly facing surface to trap the first downwardly sloping inclined ramp and a portion of the top wall between the first laterally extending anchor tab and the floor of the cup receiver.

2. The juvenile seat of claim 1, wherein the cup-receiver lock is a twist lock that includes the first laterally extending anchor tab and a tab-support sleeve that is coupled to the floor of the cup receiver and to the first laterally extending anchor tab and configured to support the first laterally extending anchor tab in spaced-apart relation to the floor of the cup receiver to provide a platform-receiving space therebetween that receives the portion of the top wall and a companion portion of the first downwardly sloping inclined ramp to establish an interference fit with the floor of the cup receiver and the first laterally extending anchor tab when the floor of the cup receiver is retained in the fixed position on the cup-receiver platform of the cupholder support.

3. The juvenile seat of claim 2, wherein the tab-support sleeve has a cylindrical shape and the floor and the first laterally extending anchor tab are arranged to lie in spaced-apart parallel relation to one another.

4. The juvenile seat of claim 3, wherein the floor of the cup receiver includes an interior layer and an exterior layer, the side wall and the interior layer of the floor cooperate to form a monolithic component made of a deformable elastic material and shaped to define the cup-receiving cavity, the exterior layer of the floor is made of a relatively rigid material and is coupled to an underside of the interior layer of the floor and to the tab-support sleeve of the twist lock to locate the first laterally extending anchor tab at a fixed distance in spaced-apart relation to the exterior layer of the floor to provide the platform-receiving space therebetween.

5. The juvenile seat of claim 1, wherein the cupholder support also includes a fence coupled to a perimeter edge of the cup-receiver platform and arranged to extend upwardly away from the top wall and the first downwardly sloping inclined ramp and the fence is arranged to surround a part of the top wall to cooperate with a topside of the top wall to form a cup-receiver-receiving space, and the floor and a lower portion of the side wall of the cup receiver are retained in the cup-receiver-receiving space when the first laterally extending anchor tab is arranged to lie in the receiver-locking position.

6. The juvenile seat of claim 5, wherein the seat bottom includes a first side bolster, a second side bolster, and a seat pad located between the first and second side bolsters, the cupholder support is coupled to the first side bolster, and the fence is formed to include a side-wall aperture facing toward the seat pad and the second side bolster and opening into the cup-receiver-receiving space to expose a section of the deformable portion of the side wall of the cup receiver that is retained in the cup-receiver-receiving space formed in the cupholder support.

7. The juvenile seat of claim 6, further comprising a seat back arranged to extend upwardly from the seat bottom, and wherein the fence includes a rear wall located between the cup-receiver platform and the seat back and a front wall arranged to lie in spaced-apart relation to the seat back to locate the rear wall therebetween.

8. The juvenile seat of claim 7, wherein the rear wall has a vertical edge that extends upwardly from the top wall and the front wall has a vertical edge that extends upwardly from the top wall and lies in spaced-apart relation to the vertical edge of the rear wall to define the side-wall aperture of the fence therebetween.

9. The juvenile seat of claim 7, wherein each of the rear and front walls includes a concave interior surface facing toward the side wall of the cup receiver retained in the cup-receiver-receiving space formed in the cupholder support.

10. The juvenile seat of claim 1, wherein the floor of the cup receiver includes an interior layer and an exterior layer, the side wall and the interior layer of the floor cooperate to form a monolithic component made of a deformable elastic material and shaped to define the cup-receiving cavity, the exterior layer of the floor is made of a relatively rigid material and is coupled to an underside of the interior layer of the floor and to the cup-receiver lock to retain the cup-receiver lock in a stationary position on the floor of the cup receiver.

11. The juvenile seat of claim 10, wherein the seat bottom includes a first side bolster, a second side bolster, and a seat pad located between the first and second side bolsters, the cupholder support is coupled to the first side bolster, and a fence is formed to include a side-wall aperture facing toward the seat pad and the second side bolster and opening into the cup-receiver-receiving space to expose a section of the deformable portion of the side wall of the cup receiver that is retained in the cup-receiver-receiving space formed in the cupholder support.

12. The juvenile seat of claim 11, wherein further comprising a seat back arranged to extend upwardly from the seat bottom, and wherein the fence includes a tall rear wall located between the cup-receiver platform and the seat back and a relatively shorter front wall arranged to lie in spaced-apart relation to the seat back to locate the tall rear wall therebetween.

13. The juvenile seat of claim 10, wherein the cup-receiver lock and the exterior layer of the floor cooperate to form a monolithic component.

14. A juvenile seat comprising
a seat bottom,
a cupholder support coupled to the seat bottom, the cupholder support including a cup-receiver platform having a top wall formed to include a lock-passage aperture and a lock retainer coupled to the underside of the top wall and arranged to extend downwardly away from the top wall and partly around the lock-passage aperture formed in the top wall, and
a cupholder including a cup receiver having a floor and a side wall arranged to cooperate with the floor to form a cup-receiving cavity, and
wherein the side wall of the cup receiver includes a deformable portion that is unsupported by the cupholder support and is configured to deform elastically to change from an initial shape and move relative to the floor to assume a different temporary shape and reduce a volume of the cup-receiving cavity temporarily only during exposure of the deformable portion to an external impact force and to return to the initial shape following cessation of the external impact force, the deformable portion is made of a deformable elastic material, and the cupholder also includes cup-receiver lock coupled to the floor of the cup receiver for engaging a downwardly facing surface of the lock retainer to retain the floor of the cup receiver in a fixed position on the cup-receiver platform of the cupholder support to locate the deformable portion of the side wall of the cup-receiver in spaced-apart relation to the cup receiver platform of the cupholder support,
wherein the floor of the cup receiver includes an interior layer and an exterior layer, the side wall and the interior layer of the floor cooperate to form a monolithic component made of a deformable elastic material and shaped to define the cup-receiving cavity, the exterior layer of the floor is made of a relatively rigid material and is coupled to an underside of the interior layer of the floor and to the cup-receiver lock to retain the cup-receiver lock in a stationary position on the floor of the cup receiver,
wherein the cup-receiver lock and the exterior layer of the floor cooperate to form a monolithic component,
wherein the cup-receiver lock is a twist lock that is coupled to an underside of the exterior layer of the floor and the twist lock includes a tab-support sleeve and first and second anchor tabs, the tab-support sleeve has an upper end coupled to the underside of the exterior layer of the floor and an opposite lower end coupled to the first and second anchor tabs, and each of the first and second anchor tabs is arranged to lie in spaced-apart relation to the underside of the exterior layer of the floor to provide a platform-receiving space therebetween that receives a portion of the top wall and a companion portion of the lock retainer to establish an interference fit with the floor of the cup receiver and the first and second anchor tabs when the floor of the cup receiver is retained in the fixed position on the cup-receiver platform of the cupholder support.

15. The juvenile seat of claim 14, wherein the tab-support sleeve has a cylindrical shape and the first and second anchor tabs are cantilevered to the lower end of the tab-support sleeve.

16. A juvenile seat comprising
a seat bottom,
a cupholder support coupled to the seat bottom, the cupholder support including a cup-receiver platform having a top wall formed to include a lock-passage aperture and a lock retainer coupled to the underside of the top wall and arranged to extend downwardly away from the top wall and partly around the lock-passage aperture formed in the top wall, and a cupholder including a cup receiver having a floor and a side wall arranged to cooperate with the floor to form a cup-receiving cavity, and wherein the side wall of the cup receiver includes a deformable portion that is configured to deform elastically to change from an initial shape and move relative to the floor to assume a different temporary shape and reduce a volume of the cup-receiving cavity temporarily only during exposure of the deformable portion to an external impact force and to return to the initial shape following cessation of the external impact force, the deformable portion is made of a deformable elastic material, and the cupholder also includes cup-receiver lock means coupled to the floor of the cup receiver for engaging a downwardly facing surface of the lock retainer to retain the floor of the cup receiver in a fixed position on the cup-receiver platform of the cupholder support to locate the deformable portion of the side wall of the cup-receiver in spaced-apart relation to the cup receiver platform of the cupholder support, wherein the cup-receiver lock is a twist lock that includes a tab-support sleeve having an upper end coupled to the underside of the floor of the cup receiver and an opposite lower end arranged to extend away from the floor of the cup receiver and a tab coupled to the opposite lower end of the tab-support sleeve configured to mate with the downwardly facing surface of the lock retainer following downward movement of the cup-retainer lock through an upwardly opening lock-receiver aperture formed in the top wall of the cup-receiver platform and subsequent rotation of the cup receiver and the twist lock about a vertical axis of rotation to cause an upwardly facing cam-follower surface of the tab to move on an inclined section of the downwardly facing surface to retain the floor of the cup receiver in the fixed position on the cup-receiver platform of the cupholder support.

17. A juvenile seat comprising a seat bottom, a cupholder support coupled to the seat bottom, the cupholder support including a cup-receiver platform having a top wall formed to include a lock-passage aperture and a lock retainer coupled to the underside of the top wall and arranged to extend downwardly away from the top wall and partly around the lock-passage aperture formed in the top wall, and a cupholder including a cup receiver having a floor and a side wall arranged to cooperate with the floor to form a cup-receiving cavity, and wherein the side wall of the cup receiver includes a deformable portion configured to deform elastically to change from an initial shape and move relative to the floor to assume a different temporary shape and reduce a volume of the cup-receiving cavity temporarily only during exposure of the deformable portion to an external impact force and to return to the initial shape following cessation of the external impact force, the deformable portion is made of a deformable elastic material, and the cupholder also includes cup-receiver lock coupled to the floor of the cup receiver to engage a downwardly facing surface of the lock retainer to retain the floor of the cup receiver in a fixed position on the cup-receiver platform of the cupholder support to locate the deformable portion of the side wall of the cup-receiver in spaced-apart relation to the cup receiver platform of the cupholder support, wherein the lock retainer includes a first downwardly sloping inclined ramp coupled to the underside of the top wall and formed to include a first end located at a first distance from the underside of the top wall and an opposite second end located at a relatively greater second distance from the underside of the top wall, the lock retainer further includes a first anti-rotation stop located under the top wall and arranged to lie in spaced-apart relation to the first end of the ramp.

* * * * *